(12) United States Patent
Yang et al.

(10) Patent No.: US 11,364,570 B2
(45) Date of Patent: Jun. 21, 2022

(54) MICRO-REGION SEMI-SOLID ADDITIVE MANUFACTURING METHOD

(71) Applicant: Beijing University Of Technology, Beijing (CN)

(72) Inventors: Wuxiong Yang, Beijing (CN); Jianglin Zou, Beijing (CN); Jiejie Xu, Beijing (CN); Shikai Wu, Beijing (CN)

(73) Assignee: Beijing University Of Technology, Beijing (CN)

( * ) Notice: Subject to any disclaimer, the term of this patent is extended or adjusted under 35 U.S.C. 154(b) by 102 days.

(21) Appl. No.: 16/740,780

(22) Filed: Jan. 13, 2020

(65) Prior Publication Data
US 2020/0147726 A1 May 14, 2020

Related U.S. Application Data

(63) Continuation of application No. PCT/CN2018/093506, filed on Jun. 29, 2018.

(30) Foreign Application Priority Data

Jul. 12, 2017 (CN) .......................... 201710564464.9

(51) Int. Cl.
*B23K 26/342* (2014.01)
*B33Y 10/00* (2015.01)
(Continued)

(52) U.S. Cl.
CPC .......... *B23K 26/342* (2015.10); *B23K 26/082* (2015.10); *B23K 26/1464* (2013.01);
(Continued)

(58) Field of Classification Search
CPC .............. B23K 26/342; B23K 26/1464; B23K 11/0013; B23K 28/00; B23K 3/0607;
(Continued)

(56) References Cited

U.S. PATENT DOCUMENTS

2002/0027155 A1* 3/2002 Okamura ............. B23K 20/125
228/112.1
2005/0150871 A1* 7/2005 Offer ....................... B23K 20/10
219/76.17
(Continued)

FOREIGN PATENT DOCUMENTS

CA 2958107 A1 * 2/2016 ............. B28B 1/001
CN 101537529 B * 3/2011
(Continued)

*Primary Examiner* — Joel M Attey
*Assistant Examiner* — Rachel R Rizzo
(74) *Attorney, Agent, or Firm* — Rimon PC

(57) ABSTRACT

A micro-region semi-solid additive manufacturing method is provided, where rod-shaped materials are used as consumables, and front ends of the consumables are heated by means of high-energy beam, an electric arc, a resistance heat, or the like, to enable the front ends to be in a semi-solid state in which the solid-liquid two phases coexist; at the same time, the rotational torsion and the axial thrust are applied to the consumables to perform shearing, agitation and extrusion on the semi-solid front ends, that is, the mold-free semi-solid rheoforming is performed. The consumable is transmitted to the bottom layer metal continuously in this manner to form metallurgical bonding, the stacking process is repeated according to a planned route obtained after discretization slicing treatment, and then an object or a stack layer in a special shape can be formed.

8 Claims, 4 Drawing Sheets

(51) Int. Cl.
*B33Y 70/00* (2020.01)
*B23K 26/082* (2014.01)
*B23K 26/14* (2014.01)
*B23K 35/00* (2006.01)

(52) U.S. Cl.
CPC .............. *B23K 35/00* (2013.01); *B33Y 10/00* (2014.12); *B33Y 70/00* (2014.12)

(58) Field of Classification Search
CPC .. B23K 35/00; B23K 10/027; B23K 15/0086; B23K 26/082; B23K 9/04; B23K 26/40; B23K 26/083; B23K 26/0869; B23K 26/38; B23K 20/103; B23K 20/22; B23K 35/0261; B23K 26/144; B23K 26/127; B23K 26/0622; B23K 26/0861; B23K 26/04; B23K 26/707; B23K 26/034; B23K 26/032; B23K 9/167; B23K 15/0026; B23K 26/702; B23K 35/0222; B23K 35/36; B23K 26/0624; B23K 35/0244; B33Y 10/00; B33Y 70/00; B33Y 30/00; B33Y 50/02; B29C 64/188; B29C 64/141; B29C 64/147; B29C 64/386; B29C 70/546; B29C 67/0081; B29C 67/0088; B29C 70/384; B29C 70/20; B29C 64/106; B29C 70/16; B29C 64/40; B22F 10/30; B22F 12/00; B22F 5/12; B22F 10/20; B23P 17/00; B32B 15/015; G01J 5/0828; G01J 5/0803; G01J 5/0806; G01J 5/0846; H05B 6/10; B21C 3/08

See application file for complete search history.

(56) References Cited

U.S. PATENT DOCUMENTS

| | | | |
|---|---|---|---|
| 2006/0289603 A1* | 12/2006 | Zettler | B23K 20/123 228/2.1 |
| 2009/0200275 A1 | 8/2009 | Twelves, Jr. et al. | |
| 2015/0174699 A1* | 6/2015 | Bruck | B23K 26/082 219/121.66 |
| 2015/0360317 A1* | 12/2015 | Kalvala | B32B 15/01 228/2.3 |
| 2016/0067827 A1* | 3/2016 | Zediker | B23K 26/144 219/76.12 |
| 2016/0193688 A1 | 7/2016 | Kironn et al. | |

FOREIGN PATENT DOCUMENTS

| | | | | |
|---|---|---|---|---|
| CN | 103753029 A | | 4/2014 | |
| CN | 105171229 A | | 12/2015 | |
| CN | 105397276 A | * | 3/2016 | |
| CN | 105397276 A | | 3/2016 | |
| CN | 106112254 A | * | 11/2016 | ............. B33Y 70/00 |
| CN | 106112254 A | | 11/2016 | |
| CN | 205927497 U | | 2/2017 | |
| CN | 104404509 B | * | 6/2017 | ............. B22F 10/20 |
| CN | 107414325 A | | 12/2017 | |
| CN | 107598358 A | | 1/2018 | |

* cited by examiner

MICRO-REGION SEMI-SOLID ADDITIVE MANUFACTURING METHOD

RELATED APPLICATIONS

This application is a continuation application of PCT/CN2018/093506, filed Jun. 29, 2018, which claims the benefit of priority from Chinese Application No. 201710564464.9, filed Jul. 12, 2017, the disclosures of which are incorporated herein by reference in their entirety.

TECHNICAL FIELD

The present invention relates to the technical field of metal additive manufacturing, and in particular, to a metal additive manufacturing method with metal semi-solid processing properties.

BACKGROUND

In the existing metal additive manufacturing technology, because multiple non-equilibrium thermophysical processes and metallurgical processes cause poor uniformity and stability of the component structure and performance, serious deformation and cracking tendency, and easily generate defects such as pores, shrinkage holes and incomplete fusion, all the problems seriously affect the service performance of additive parts, and also bring great difficulties to the development and promotion of additive manufacturing technologies.

Usually, the solution to the defects such as pores is post-densification: usually for hot isostatic pressing. The control of the microstructural morphology is solved by heat treatment, and methods such as preheating, heat treatment, optimization process route, compound external fields (such as shot blasting, electromagnetic field, or ultrasound) and the like are used to solve residual stress and workpiece deformation. Although these methods can alleviate the above problems to a certain extent, they require special equipment and additional processes, are inconvenient to operate, and affect processing efficiency, thus even being unable to process some large-sized components or having large expenses. To sum up, these methods alleviate these defects to a certain extent, but they do not fundamentally solve the problems.

SUMMARY

An object of the present invention is to provide an additive manufacturing method for strong external intervention of metal solidification process, and mainly refers to that strong mechanical force is applied to the semi-solid metal coexisting in the solid-liquid two phases during the solidification process, which changes the traditional dendrite growth mode to the equiaxed crystal fine grain growth mode. At the same time, the mechanical force can eliminate the shrinkage and pores of the fused layer to increase the density, and improve the stress distribution state of the formed body to reduce the deformation and cracking tendency of the workpiece.

The technical solution of the present invention is:

The raw materials (consumable materials) for additive manufacturing are straight rod and strip metal, and heating modes such as high-energy beam, electric arc and resistance heat are applied to the front end region of the consumable material and make it semi-solid state. At the same time, the rotational torsion and the axial thrust applied on the consumables have powerful effects such as shearing, agitation and extrusion, and this process is essentially a mold-free semi-solid rheoforming process. Instead of the mold, the underlying material and the consumable material body are in contact with the semi-solid material, except that the consumables are transited to the underlying material to form a stack layer through the semi-solid forming process. The stacking process is stacked in a set path and lamination to form an entity of a particular size and shape.

1. A micro-region semi-solid additive manufacturing method, wherein consumable materials are manufactured with rod or strip shaped materials as additives, and are hereinafter referred to as consumables; during operation, a claw drives the consumables to rotate at a speed of 200-10000 rpm and an axial thrust of 10-2000 N is applied to the consumables, and the heat source is used to heat the front end surface of the consumables to a liquid or semi-solid state; in the subsequent cooling and solidification process, the hot metal at the end of these consumables undergoes agitation and extrusion under the action of the axial thrust, rotational torsion and the counter-acting force of substrate or stack layers, to form a mold-free semi-solid rheological processing metal structure; the consumables are uniformly pushed forward at a consumption speed of 0.1-2 m/min and are moved at a speed of 0.1-4 m/min based on a moving path generated by the discrete sections to form continuous stack layers, and the stacking process is repeated to form a molded body; and the heat source comprises a laser beam, an electron beam, a plasma beam, an electric arc, a resistance heat, an induction heating or flame.
2. Further, the electric arc is provided by TIG (Tungsten Inert Gas), MIG (Melt Inert Gas) or CMT (Cold Metal Transfer).
3. Further, the a consumable form is rod or strip shaped materials, and cross-section shape is a solid circle, a hollow circle, a rectangle, or a polygon; one or more consumables are arranged side by side; the length of each consumable is 5-600 cm, and the consumables are used one by one; and the laser spot shape is a circular spot, an elliptical spot, a rectangular spot or a multi-spot.
4. Further, The inclination angle of the consumable between the centerline of the consumable and the stack layer is 45°-90°, and the inclination direction is opposite to the moving direction of the consumable; the self-moving mode of the consumable is rotation or plane reciprocating motion; and the laser acts on the front side of the moving direction of the consumable and opposites to the consumable, and the angle of the laser and the stack layer is 5°-60°.
5. Further, the upper and lower vibrations are added to the consumables to enhance the forging effect, where the vibration frequency is 1 Hz to 1 kHz, and the vibration amplitude is 0.1-1 mm.
6. Further, high energy beam heat sources such as the laser and the electron beam work in a scanning heating mode, and the scanning frequency is 1 Hz to 5 kHz.
7. Further, one or several combination external fields of current, magnetic field and ultrasound are simultaneously applied to the consumables to enhance the control effect of metallographic structure and performance.
8. Further, in the additive manufacturing process, reinforced composite materials or functionally graded materials are prepared by simultaneously injecting alloy powder having a size of 20 nm to 500 μm, reinforced particles, whiskers or short fibers into a V-shaped opening between the consumable and the stack layer.

Compared with other metal deposition processes, the present invention has the following advantages and benefits:

The additive manufacturing technology is combined with the semi-solid technology, and the semi-solid rheoforming process is introduced into the additive manufacturing process. After solidification of the metal, a uniform spherical fine-grained structure can be obtained without macrosegregation. The metal solidifies under the action of extrusion and stirring, which can eliminate the defects such as pores, voids, shrinkage and slag inclusion inside the stack layer, and the workpiece can reach full density and improve the stress distribution state of the formed body, so as to reduce the deformation and cracking tendency of the workpiece.

The semi-solid forming metal has a small solidification shrinkage rate, can improve the forming dimensional accuracy, and is easy to achieve near-net forming. During the semi-solid metal forming and processing process, the slurry is always in a controlled and steady state, so that the flowing and splashing of the metal solution hardly occur, and the oxidation and entrapment of the alloy are alleviated. The purity of the material is enhanced, and at the same time, the multi-directional growth can be achieved without providing a special support structure. Compared with powdery consumable materials, the rod and strip materials have obvious advantages such as abundant material types, high material utilization rate, high economic efficiency, and low pollution.

There is no special restriction on the type of heat source, no complicated equipment is required, and the stress, deformation and structure are well controlled. In most cases, the subsequent processing can be omitted and the process flow can be shortened. Compared with the castings; the semi-solid forming has a low forming temperature, strong controllability in structure and properties; and compared with the forge pieces, it has a small forming resistance and a strong controllability, with mechanical property reaching or exceeding the forging level. Semi-solid additive manufacturing with high energy beam as the heat source can achieve or exceed forgings in both static mechanical properties and fatigue properties.

The semi-solid material has high viscosity, and the composite material or the gradient functional material can be prepared by synchronous injection or surface pre-formed alloy powder or reinforcing fiber or ceramic particles during the processing, which can completely solve the macrosegregation and uneven distribution of the reinforced phase.

The present invention opens up a new method for additive manufacturing and provides a new idea for the development and popularization of semi-solid forming technology.

DETAILED DESCRIPTION

Specific embodiment 1: the consumable material of this embodiment is 304 stainless steel round rod with a diameter of 5 mm, the substrate is Q235 low carbon steel. The angle between the consumable material rod 1 and the stack layer 4 is 75°, the angle between the laser beam 2 and the stack layer 4 is 15°, the laser power is 4 KW, and the laser focusing spot is rectangular and has a size of 6 mm×1 mm.

Figure 1:
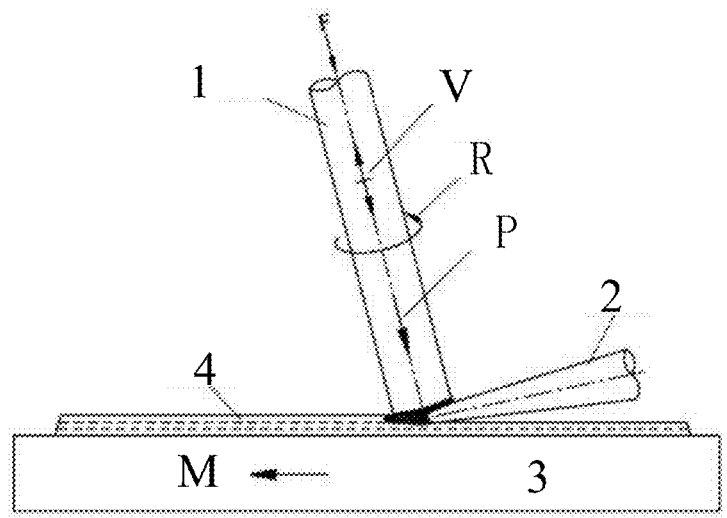
FIG. 1 is a schematic diagram showing the principle of a micro-region semi-solid additive manufacturing method by using a laser as a heat source and driving consumables to vibrate up and down.
Figure 2:
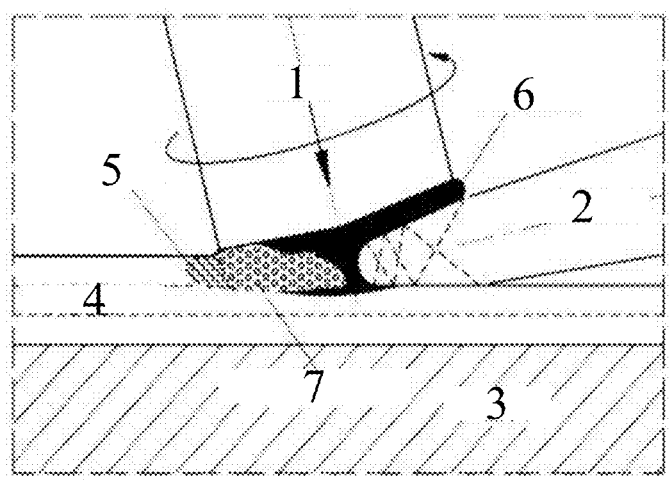
FIG. 2 is a local enlargement schematic diagram showing the principle of a micro-region semi-solid additive manufacturing method by using a laser as a heat source.

The specific forming process includes the following steps:
1. Establish a 3D model of the metal parts, complete the slicing process by software and generate a machine processing path;
2. Remove the oxide film and dirts on the surface of the substrate and consumables;
3. Arrange the relative positions of the consumables, the substrate and the laser according to the settings, fasten the substrate, and use the three claws with water-cooling function to catch the consumables;
4. Turn on the power to make the three claws to drive the rod-shaped consumables to rotate, with the rotation speed of 800 n/min, and check the coaxiality and roundness deviation of the rotation of the consumables;
5. Open the inert gas protection, with the flow rate of argon gas of 30 L/min, and the diameter of the nozzle of 10 mm;
6. When the consumable rod 1 rotates R, it moves downwardly P and squeezes the substrate, and the three claws apply auxiliary upper and lower vibration V and axial thrust F to the consumables while rotating, with the thrust of 200 N;
7. When the laser is turned on, the moving mechanism is started, and the moving mechanism moves M at a running speed of 0.6 m/min according to the planned processing path, and the additive manufacturing process is implemented; and
8. Repeat the stacking process of step 7 to finally obtain the stack body, and perform the remaining processing and detection on the stack body. Where, FIG. 2 shows a liquid metal region 6, a semi-solid metal region 7 and a solidification region 5.

Figure 7:
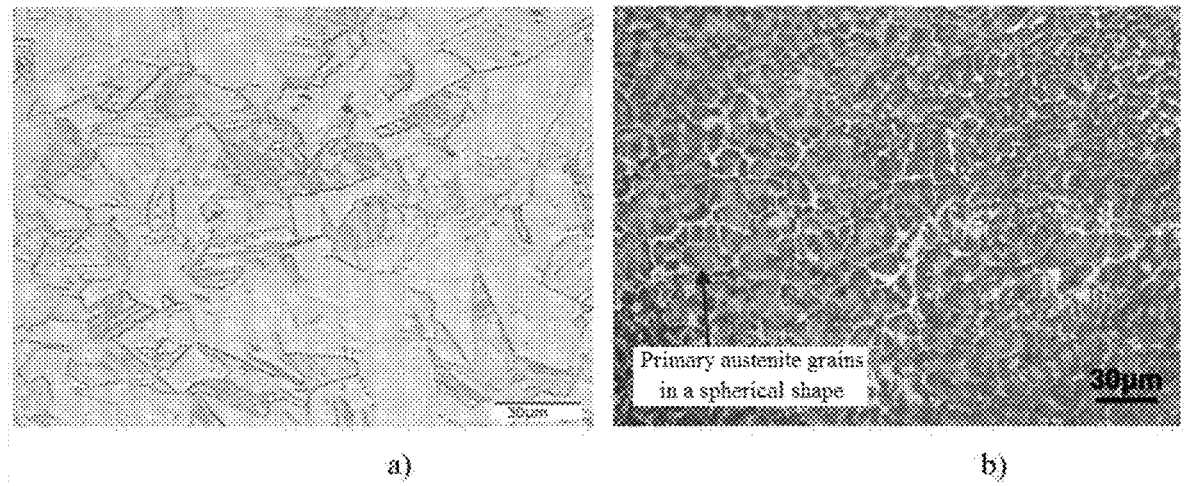
FIG. 7 is a comparison of the microstructure characteristics of semi-solid laser additive manufacturing: a) stainless steel original structure, and b) stainless steel semi-solid laser additive structure.
Figure 8:
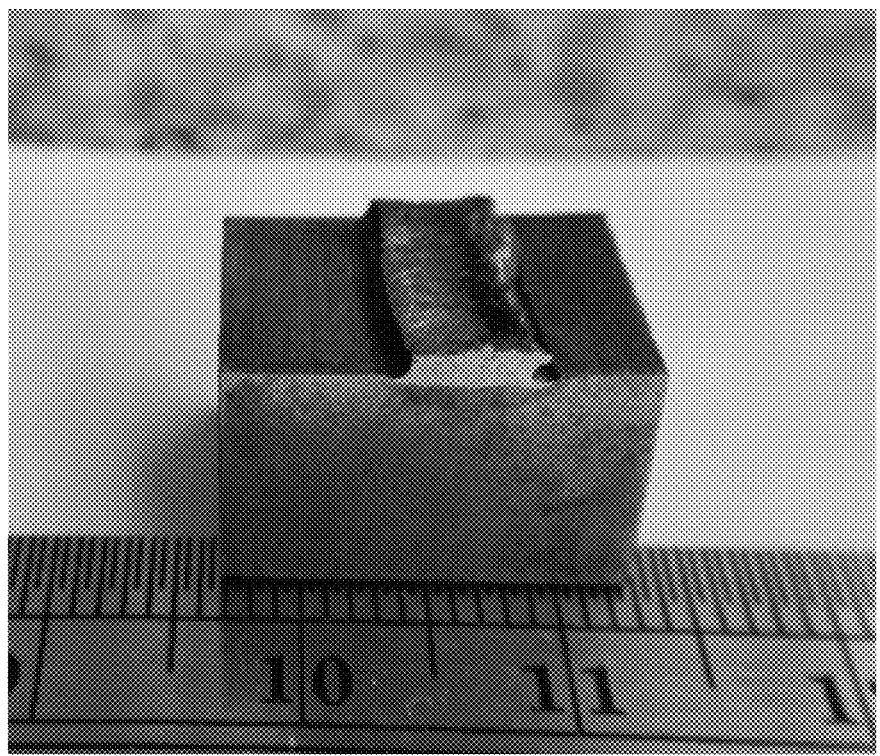
FIG. 8 is a schematic diagram showing the surface and cross section of a single stack layer in a micro-region semi-solid additive manufacturing method.

FIG. 7 is a comparison of the 304 stainless steel forming structure and the consumable rod 1 original structure of this embodiment. FIG. 7(*a*) is the original structure of the 304 stainless steel rod consumable, mainly composed of large pieces of primary austenite, and the grain boundary morphology is mainly flat. FIG. 7(*b*) shows the micro-region semi-solid laser forming structure. The primary austenite grains form a specific spherical or pellet shape under intense stirring and friction, and the grain size is finer. The bright part between spherocrystals is not a grain boundary in the conventional sense, but an extremely fine liquid phase hardened structure, so that it is almost impossible to distinguish its morphology under an optical microscope.

Specific embodiment 2: This embodiment differs from specific embodiment 1 in that: the consumable materials are two metal rods with a diameter of 3 mm arranged side by side, and other steps and parameters are the same as those in specific embodiment 1.

Figure 3:
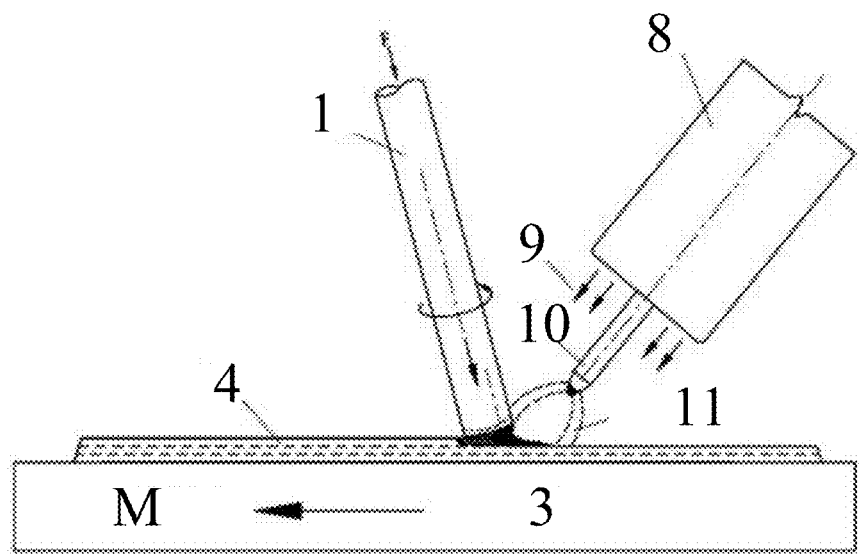
FIG. 3 is a schematic diagram showing the principle of a micro-region semi-solid additive manufacturing method by using TIG as a heat source.

Specific embodiment 3: as shown in FIG. 3, this embodiment differs from specific embodiment 1 in that: the heat source is TIG 8, the angle between the welding gun and the stack layer 4 is 55°, the diameter of the consumable rod 1 is 4 mm, the angle between the consumable rod 1 and the stack layer 4 is 60°, the current is 200 A, the processing speed is 0.3 m/min, the axial thrust of the consumable materials is 100 N, and other steps and parameters are the same as those in specific embodiment 1. TIG welding gun 8 provides a shielding gas 9 and an electric arc 11 via a tungsten electrode 10.

Figure 4:
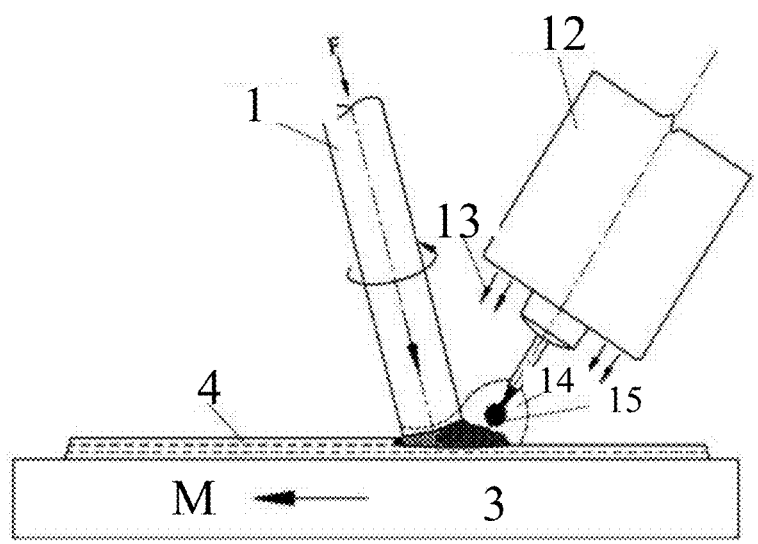
FIG. 4 is a schematic diagram showing the principle of a micro-region semi-solid additive manufacturing method by using MIG as a heat source.

Specific embodiment 4: as shown in FIG. 4, this embodiment differs from specific embodiment 1 in that: the heat source is MIG 12, the angle between the welding gun and the stack layer 4 is 55°, the angle between the consumable rod 1 and the stack layer 4 is 60°, the current is 300 A, the processing speed is 0.4 m/min, the axial thrust of the consumable materials is 100 N, and other steps and parameters are the same as those in specific embodiment 1. MIG welding gun 12 provides a shielding gas 13 and an electric arc 14, and a wielding wire of the MIG welding gun 12 melts into droplets 15.

Figure 6:
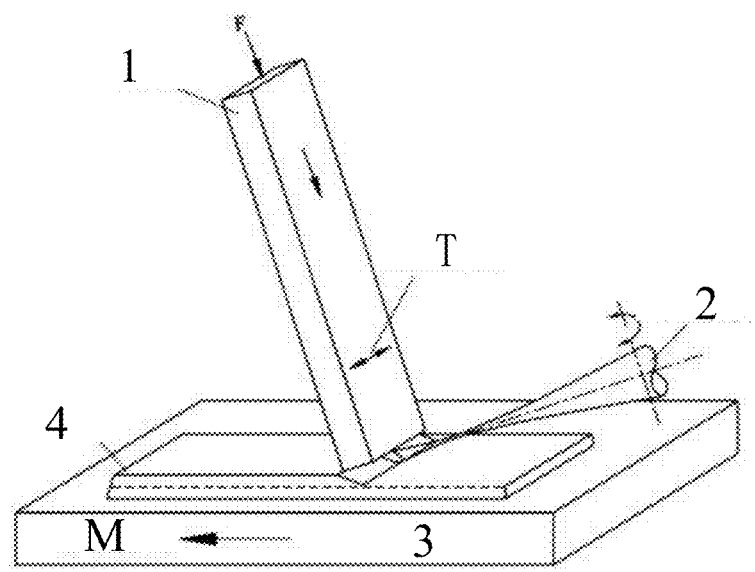
FIG. 6 is a schematic diagram showing the principle of manufacturing the laser micro-region additive for the lateral reciprocating motion of rectangular consumables.

Specific embodiment 5: as shown in FIG. 6, this embodiment differs from specific embodiment 1 in that: the consumable materials are rectangular strips with a section size of 10 mm×3 mm, and the self-moving mode of the consumable materials is transverse mechanical reciprocating motion, with the reciprocating frequency of 100 Hz, the amplitude of 0.8 mm, the laser power of 6 KW, and the processing speed of 0.4 m/min.

Figure 5:
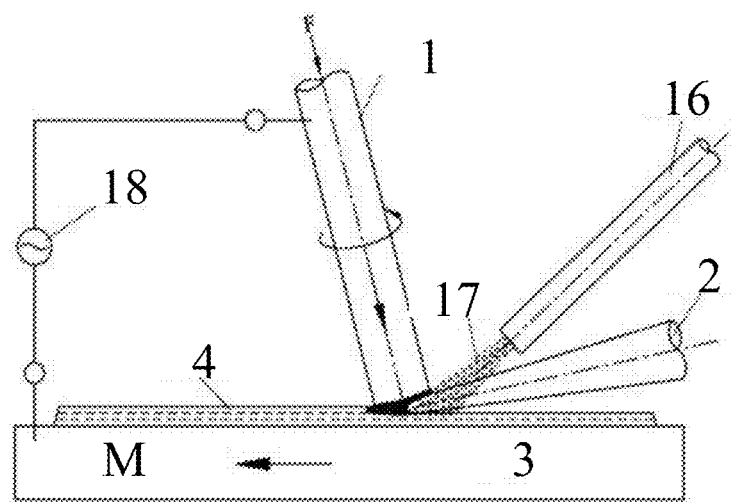
FIG. 5 is a schematic diagram showing the principle of particle reinforced composites preparing and micro-region semi-solid laser additive manufacturing.

Specific embodiment 6: as shown in FIG. 5, this embodiment differs from specific embodiment 1 in that: Both the consumable rod 1 and the substrate are 6061 aluminum alloy, the laser power is 6 KW, the moving speed of the consumable materials is 0.4 m/min, and the axial thrust of the consumable materials is 50 N, an alternating current is applied to the consumable rod 1, and during the forming process, 320 mesh SiC reinforced particles 17 are injected into the angle between the consumable materials and the stack layer 4 via a powder-feeding nozzle to prepare particle reinforced aluminum matrix composite materials with a volume fraction of 25% added. Other steps and parameters are the same as in specific embodiment 1.

SiC reinforced aluminum matrix composite materials prepared by the micro-region semi-solid additive manufacturing method have a full density, the particle and matrix interface are well bonded, the elastic modulus strength is increased by 27%, and the strength is increased by 18%.

The above embodiments are merely further description of the present invention, and specific embodiments of the present invention are not limited to the description. A series of methods derived from simple derivation and modification should be considered as belonging to the scope claimed in the present invention without departing from the concept of the present invention.

What is claimed is:

1. A micro-region semi-solid additive manufacturing method, comprising steps of: driving rod or strip shaped consumable to rotate at a speed of 200-10000 rpm with an axial thrust of 10-2000 N and a vibration along up-down direction applied to the consumable; heating a front end surface of the consumable by a heat source to a liquid; in a subsequent cooling and solidification process, agitating and extruding an end of the consumable heated under the axial thrust, a rotational torsion and a counter-acting force from a substrate or a current stack layer, to form a mold-free semi-solid rheological processing metal structure during which a dendrite growth mode is changed to an equiaxed crystal fine grain growth mode;

uniformly pushing the consumable forward at a consumption speed of 0.1-2 m/min and moving the consumable at a speed of 0.1-4 m/min along predetermined moving paths to form continuous stack layers, and repeating the steps of the uniformly pushing and the moving the consumable to form a molded body;

wherein the heat source comprises a laser beam, an electron beam, a plasma beam, an electric arc, a resistance heat, an induction heating or flame.

2. The semi-solid additive manufacturing method according to claim 1, wherein the heat source is the electric arc, which is provided by Tungsten Inert Gas (TIG), Melt Inert Gas (MIG) or Cold Metal Transfer (CMT).

3. The semi-solid additive manufacturing method according to claim 1, wherein the consumable is rod or strip shaped materials, and cross-section shape of the consumable is a solid circle, a hollow circle, a rectangle, or a polygon;

one or more consumables are provided and arranged side by side; a length of each of the consumables is 5-600 cm, and the consumables are used one by one; and a laser spot shape is a circular spot, an elliptical spot, a rectangular spot or a multi-spot.

4. The semi-solid additive manufacturing method according to claim 1, wherein an inclination angle of the consumable between centerline of the consumable and the current stack layer is 45°-90°, and an inclination direction is opposite to a moving direction of the consumable; a self-moving mode of the consumable is rotation or plane reciprocating motion; and the heat source acts on the front end surface of the consumable in a moving direction of the consumable and is opposite to the consumable, and an angle between the heat source and the current stack layer is 5°-60°.

5. The semi-solid additive manufacturing method according to claim 1, wherein a frequency of the vibration is 1 Hz to 1 kHz, and an amplitude of the vibration is 0.1-1 mm.

6. The semi-solid additive manufacturing method according to claim 1, wherein the heat source in forms of the laser beam or the electron beam works by a scanning heating with a scanning frequency of 1 Hz to 5 kHz.

7. The semi-solid additive manufacturing method according to claim 1, wherein an external field selected from a group consisting of current, magnetic field and ultrasound and combinations of these is simultaneously applied to the consumable.

8. The semi-solid additive manufacturing method according to claim 1, wherein in the additive manufacturing process, reinforced composite materials or functionally graded materials are prepared by simultaneously injecting alloy powder having a size of 20 nm to 500 μm, reinforced particles, whiskers or short fibers into a V-shaped opening between the consumable and the current stack layer.

* * * * *